(12) United States Patent
Heimbaugh et al.

(10) Patent No.: US 7,085,094 B1
(45) Date of Patent: Aug. 1, 2006

(54) INTERLEAVED REPEATABLE RUNOUT CORRECTION FOR DATA STORAGE DEVICE

(75) Inventors: Mark Heimbaugh, Pleasanton, CA (US); Yu Sun, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 92 days.

(21) Appl. No.: 10/984,558

(22) Filed: Nov. 8, 2004

Related U.S. Application Data (60) Provisional application No. 60/518,501, filed on Nov. 6, 2003.

(51) Int. Cl.
*G11B 5/596* (2006.01)

(52) U.S. Cl. .................... 360/77.04; 360/77.06

(58) Field of Classification Search ............ 360/77.04, 360/77.06
See application file for complete search history.

(56) References Cited

U.S. PATENT DOCUMENTS

| | | | | |
|---|---|---|---|---|
| 5,592,346 | A * | 1/1997 | Sullivan | 360/77.04 |
| 6,937,424 | B1 * | 8/2005 | Chang et al. | 360/77.04 |
| 7,009,805 | B1 * | 3/2006 | Wong et al. | 360/77.06 |

* cited by examiner

*Primary Examiner*—Wayne Young
*Assistant Examiner*—Jason Olson
(74) *Attorney, Agent, or Firm*—Tejpal S. Hansra (57) ABSTRACT

A reduction in computational load associated with correction of repeatable runout is provided. Rather than performing DFT for each analyzed frequency at each interrupt, at least some frequencies are not analyzed in the same interrupt period. DFTs for different frequencies may be staggered or interleaved. DFTs for different frequencies may be performed at different rates, preferably, using higher rates for higher frequencies.

47 Claims, 5 Drawing Sheets

INTERLEAVED REPEATABLE RUNOUT CORRECTION FOR DATA STORAGE DEVICE

CROSS-REFERENCE TO RELATED APPLICATIONS

Priority is claimed from U.S. Provisional Patent Application Ser. No. 60/518,501, entitled "Multi-Rate Repeatable Runout Correction Using Interleaving to Reduce Effective Computation Time," filed Nov. 6, 2003, which is incorporated herein by reference in its entirety.

FIELD OF THE INVENTION

The present invention relates to a method and apparatus for reducing computational load associated with correction of repeatable runout in a disk drive (or other data recording device) and, in particular, to a method and apparatus that uses interleaving.

BACKGROUND INFORMATION

A number of data recording and/or playback devices, including magnetic disk drives, include rotating components which can lead to a phenomena generally referred to as runout. In the case of a magnetic disk drive, in an idealized drive configured with nominally concentric data tracks, if a read/write head is kept a constant radial distance from the (nominal) axis of rotation, there will be no change in the distance (if any) from the read/write head to the desired data track, as the disk rotates. In actuality, however, many factors can contribute to deviations from this ideal condition such that small tracking correction forces must be applied to the read/write head to maintain the head sufficiently aligned with a desired data track, as the disk rotates. Although some amount of tracking error (e.g., a few percent, such as around 8 percent, expressed in terms of percentage of track-to-track distance) can be tolerated, most modern disk drives provide apparatuses and procedures for making tracking corrections to assist in maintaining tracking within acceptable ranges.

Typically, deviations of the actual track location from the ideal concentric location (i.e., "runout") can be considered to include repeatable components (i.e., at least partially predictable and, therefore, correctible) and non-repeatable components. In at least one approach, actual tracking errors are measured, and attempts are made to distinguish repeatable from non-repeatable components, so that steps can be taken to at least partially correct for the repeatable components. Many techniques for determining or approximating repeatable runout (RRO) involve measurements taken over multiple sectors and/or multiple revolutions and, thus, can be somewhat time-consumptive. Accordingly, it is generally desirable to employ procedures which converge on an RRO estimate relatively quickly.

Repeatable runout can also be considered as having both substantially static and dynamic components. Static components, which remain substantially unchanged over time and/or in response to environmental changes, are (in at least some approaches) measured, and appropriate runout corrections are written into some or all servo sectors for each track (termed "embedded runout correction" or ERC). However, even after ERC is applied, there may be an amount of runout which still occurs and which may change over time or in response to environmental changes. In at least some approaches, active or "adaptive" runout correction is used to at least partially correct for such dynamic runout. One general approach for adaptive runout correction (ARC) involves performing a processor "interrupt" (in response to encountering each servo sector) to execute a Fourier transform technique to determine the power or amplitude of the base frequency (typically the disk rotational rate) component of dynamic RRO and of various harmonics (typically second through $n^{th}$ harmonics). The determination of the power frequency distribution for the dynamic runout is then used to calculate corrections such as ARC feed-forward ("ARCFF") values which (appropriately converted and conditioned) are combined with a position error signal (PES) or other tracking signal in such a way as to drive the head toward to a zero tracking error position.

In at least some configurations, calculation of the Fourier transform and/or the feed-forward signal is performed by circuitry (such as a programmed microprocessor, although other processing equipment such as an application specific integrated circuit ("ASIC") or gate array may be involved). This circuitry typically is also used for other purposes during operation of the disk drive. Accordingly, the computational load which is devoted to RRO correction must be kept low enough that sufficient computational resources remain available for other functions. Unfortunately, the trends in recent disk drives, especially trends towards higher data density, generally have increased computational load associated with RRO correction. For example, higher spatial density of data on the surface of the disk involves smaller track-to-track distances thus typically requiring greater tracking accuracy, including more accurate RRO correction. Often, increasing RRO correction accuracy includes calculating for higher harmonics which, using previous methods, could increase computational load to an undesirable level. Furthermore, increased data density may involve a larger number of servo sectors per track, thus, (for a constant rotation rate) reducing the amount of time between successive servo sectors. Accordingly, even when the amount of RRO correction calculations for each sector remains constant, as the sector period becomes smaller, the percentage of each sector transmit time devoted to RRO correction increases.

Accordingly, it would be useful to provide apparatuses and methods which can reduce the computational load associated with adaptive RRO correction, preferably, without reducing accuracy of the corrections to an unacceptable degree.

SUMMARY OF THE INVENTION

The present invention includes a recognition of the source, nature and/or existence of problems in previous approaches, including those described herein.

According to one embodiment of the present invention, the rate at which the power or amplitude is calculated, and/or the rate at which an associated feed-forward component is calculated, is different for at least two different frequencies. For example, the power for the fundamental frequency and/or its associated feed-forward component might be calculated once every fourth servo sector, while the power associated with the fourth harmonic might be calculated every servo sector.

In one embodiment, at least two different frequency components (e.g., two different harmonics) are not always calculated during the same interrupt (i.e., there is at least one sector in which the power or amplitude for one of the harmonics (and/or the associated feed-forward value component) is calculated, but the power or amplitude (or associated feed-forward component) for a second harmonic is not calculated (but is, rather, calculated in a different sector)).

Because, according to this aspect, it is not necessary to perform all the calculations associated with all the different harmonics being analyzed at each sector (or "interrupt"), there is less computational load associated with this method (compared to previous approaches which perform all calculations for all analyzed harmonics at each interrupt). Preferably, calculations associated with the higher harmonics are performed relatively more frequently (such as at every interrupt, or nearly every interrupt). This approach provides for little, if any, decrease in accuracy of the adaptive runout correction since lower frequencies require fewer sample points to properly characterize that frequency (to a defined, or required, degree of accuracy). Accordingly, by providing multiple rates of calculation for different harmonics and/or interleaving the calculation periods used for different harmonics, the total calculation load used for adaptive runout correction can be reduced with little, if any, degradation in accuracy of the adaptive runout correction.

In one embodiment, a reduction in computational load associated with correction of repeatable runout is provided. Rather than performing DFT for each analyzed frequency at each interrupt, at least some frequencies are not analyzed in the same interrupt period. DFTs for different frequencies may be staggered or interleaved. DFTs for different frequencies may be performed at different rates, preferably, using higher rates for higher frequencies.

DETAILED DESCRIPTION OF THE PREFERRED EMBODIMENT

Figure 8:
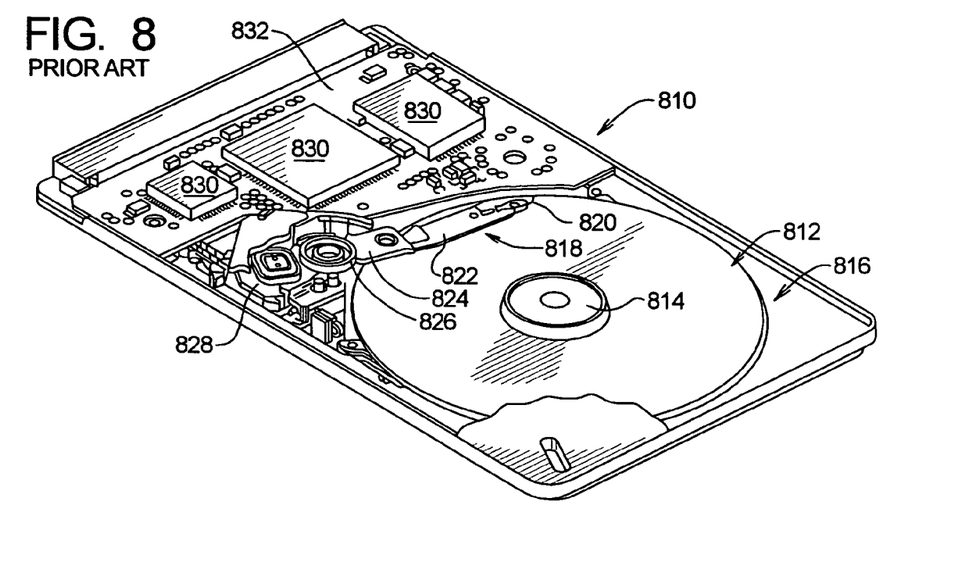
FIG. 8 is a diagrammatic representation illustrating a conventional disk drive with its top cover removed; and, FIG. 9 is a diagrammatic representation of a top view of a magnetic storage disk illustrating a typical organization of data on a disk surface.

A disk drive, generally designated 810, is illustrated in FIG. 8. The disk drive comprises a disk 812 that is rotated by a spin motor 814. The spin motor 814 is mounted to a base plate 816. An actuator arm assembly 818 is also mounted to the base plate 816.

The actuator arm assembly 818 includes a transducer 820 (which may include a read head and a write head) mounted to a flexure arm 822 which is attached to an actuator arm 824 that can rotate about a bearing assembly 826. The actuator arm assembly 818 also contains a voice coil motor 828 which moves the transducer 820 relative to the disk 812. The spin motor 814, voice coil motor 828 and transducer 820 are coupled to a number of electronic circuits 830 mounted to a printed circuit board 832. The electronic circuits 830 typically include a read channel chip, a microprocessor-based controller and a random access memory (RAM) device.

The disk drive 810 typically includes a plurality of disks 812 and, therefore, a plurality of corresponding actuator arm assemblies 818. However, it is also possible for the disk drive 810 to include a single disk 812 as shown in FIG. 8.

Figure 9:
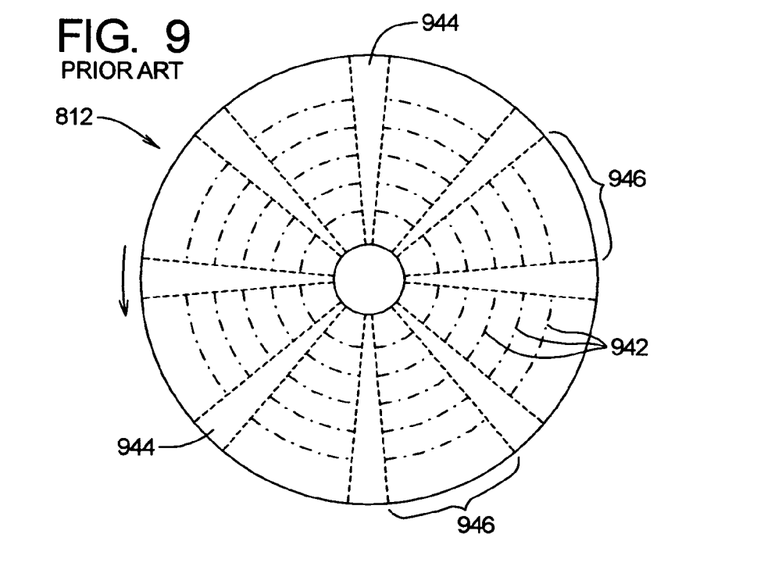

FIG. 9 is a top view of a magnetic storage disk 812 illustrating a typical organization of data on the surface of the disk 812. As shown, the disk 812 includes a plurality of concentric data storage tracks 942, which are used for storing data on the disk 812. The data storage tracks 942 are illustrated as center lines on the surface of the disk 812; however, it should be understood that the actual tracks will each occupy a finite width about a corresponding centerline. The data storage disk 812 also includes servo information in the form of a plurality of radially-aligned servo spokes 944 (or wedges) that each cross the tracks 942 on the disk 812. The servo information in the servo spokes 944 is read by the transducer 820 during disk drive operation for use in positioning the transducer 820 above a desired track 942 of the disk 812. The portions of the track between servo spokes 944 are used to store customer data received and are referred to as customer data regions 946.

It should be understood that, for ease of illustration, only a small number of tracks 942 and servo spokes 944 have been shown on the surface of the disk 812 of FIG. 9. That is, disk drives include one or more disk surfaces having a considerably larger number of tracks and servo spokes.

Figure 1:
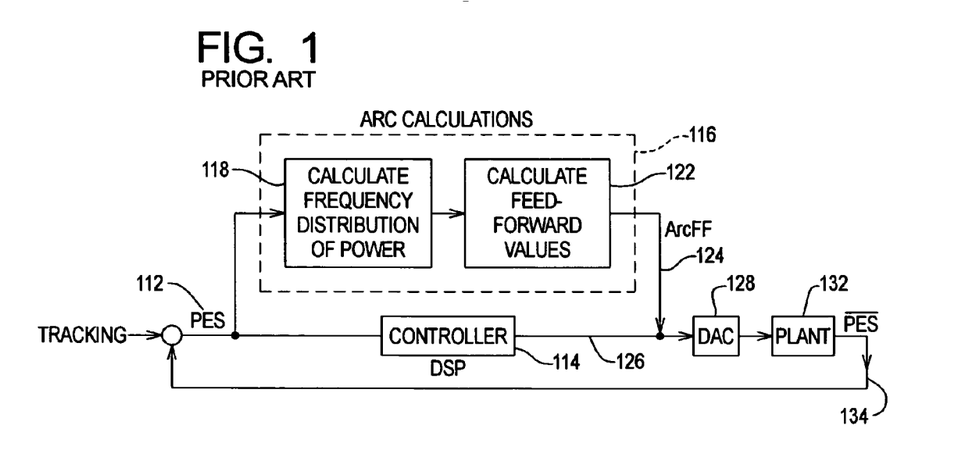
FIG. 1 is a block diagram showing the logical schema for ARCFF calculations according to previous approaches.

As noted above, and as generally understood by those of skill in the art, repeatable runout can be dealt with by providing part of the correction in an embedded sense, and another part of the correction as adaptive correction. As depicted in FIG. 1, in one approach, the position error signal 112 can be processed substantially in parallel by a digital signal processor (DSP) or other controller 114 (e.g., for coarse tracking and the another part of the correction as adaptive correction. As depicted in FIG. 1, in one approach, the position error signal 112 can be processed substantially in parallel by a digital signal processor (DSP) or other controller 114 (e.g., for coarse tracking and the like) and can be used in adaptive runout compensation (ARC) calculations 116. Although FIG. 1 shows the controller 114 and ARC calculations 116 as separate boxes, only to clarify the logical schema, it is possible to use embodiments in which the microprocessor (or other electronic components) is involved in both operations 114, 116. The ARC calculations 116 can be generally considered as involving the calculation of the frequency distribution of the PES signal 118, such as by using one or more discrete Fourier transform (DFT) procedures, e.g., a single DFT procedure for each harmonic to be analyzed, and a procedure 122 for calculating the feed-forward values based on the frequency distribution, so as to output an ARC feed-forward (ARCFF) signal 124. The ARCFF signal 124 is combined with the output 126 from the controller 114, and after processing by digital-to-analog converter (DAC) 128 is provided to the "plant" 132 such as a voice coil motor or other actuator of the disk drive. The plant outputs a new PES signal, PES 134, which is returned to be combined with the input signal as depicted in FIG. 1. For purposes of the present illustration, it is assumed that only the root and the first two harmonics are analyzed using the DFT procedures.

Figure 2:
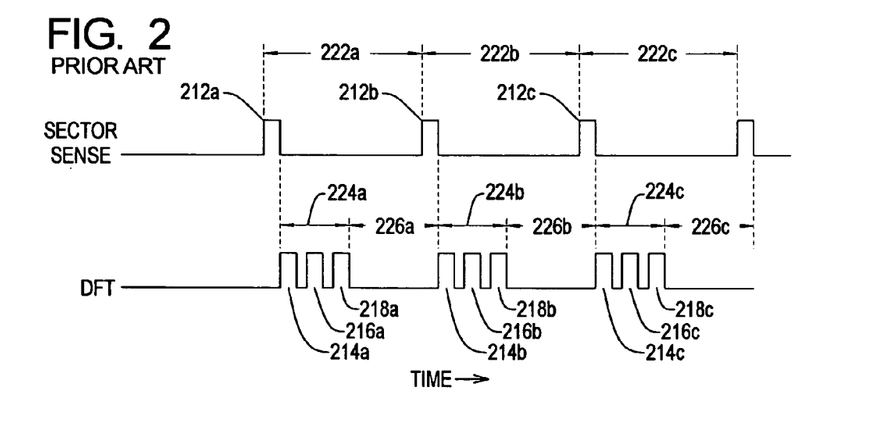
FIG. 2 is a simplified timing diagram showing relative timing of sectors and DFT processes according to previous approaches.

FIG. 2 is a simplified timing diagram illustrating general timing relationships between the beginning of sectors and the execution of DFT procedures. In FIG. 2, the occurrence of servo sectors (or more precisely, the detection of signals, from a read head, indicative that a servo sector is passing under the read head, as the disk is rotating) occur at times 212a, 212b, 212c. In the illustration of FIG. 2, following the first sector since event 212a, three DFT procedures are performed, respectively for analyzing the root, second and third harmonics 214a, 216a, 218a, respectively. Thus, of the total amount of time 222 available for the various processing tasks between successive sector-sense events 212a, 212b, a certain amount of time 224a is required to complete the three DFT procedures illustrated. Although the FIG. 2 is illustrative in nature and not necessarily to scale, in general, the amount of time required for DFT processing, or other ARC processing, is directly related to the number of frequencies which are analyzed. Following the next sector senses 212b, 212c similar periods of time 224b, 224c are consumed in DFT procedures 214b, 216b, 218b and in DFT procedures 214c, 216c, 218c. The period of time 226a, 226b, 226c remaining in each sector period 222a, 222b, 222c, after allowing for the periods of time 224a, 224b, 224c, required for doing ARC calculations, is available for use by the microprocessor (or other circuitry) for performing other calculations related to operation of the disk drive.

A number of features of the procedure, illustrated in FIG. 2, are apparent. First, in previous approaches the rate of analysis for each analyzed frequency was substantially the same (and, in the example illustrated in FIG. 2, equal to the rate of sector-sense events). Specifically, the rate at which the root frequency DFT analyses occur 214a, 214b, 214c is substantially equal to the rate at which the second harmonic DFT analyses occur 216a, 216b, 216c and the rate at which the third harmonic DFT analyses occur 218a, 218b, 218c. Furthermore, in previous approaches, if N frequencies were being analyzed (N=3 in the illustration of FIG. 2), whenever analysis of one of the frequencies occurs in a sector, analyses of all N frequencies also occur in the same sector. Specifically, in the illustration of FIG. 2, following the first sector sense 212a, all three frequencies (root, second harmonic and third harmonic) are analyzed 214a, 216a, 218a. Similarly, following the second sector sense 212b, all three frequencies being analyzed are analyzed 214b, 216b, 218b, and so forth.

As can be seen from FIG. 2, if increases in data density or other trends result in an increase of the frequency of sector-sense events 212a, 212b, 212c (and thus a decrease in sector periods 222a, 222b, 222c, the total amount of time for performing both ARC calculation 224a, 224b, 224c and for performing any other needed or desired calculations 226a, 226b, 226c, during any given sector period, decreases. Furthermore, as increases in data density or other trends make it desirable to increase the number of harmonics which are analyzed, e.g., such that four or more DFT procedures are performed in each sector (as opposed to the three DFT procedures illustrated in FIG. 2), the computational load associated with ARC calculations increases. Thus, in the absence of procedures or devices for reducing the computational load associated with ARC calculations, increases in data density and similar trends could require utilization of faster and/or more expensive processors or other components in order to perform all needed and/or desired calculations during each servo period.

Aspects of the present invention reflect an appreciation of the fact that, in at least some circumstances, performing a DFT for a given harmonic at every sector, e.g. as done in some prior approaches, provides greater time-resolution than may be necessary. According to embodiments of the present invention, approaches are provided for obtaining adaptive runout corrections with necessary or desirable degrees of accuracy, but which reduce the computational load associated with ARC computations.

Figure 3:
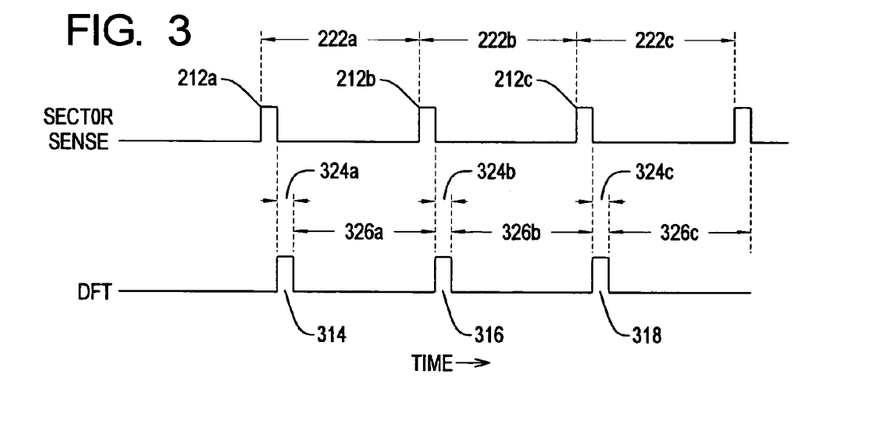
FIG. 3 is a simplified timing diagram showing relative timing of sectors and DFT processes according to an embodiment of the present invention.

FIG. 3 shows one approach to decreasing the computational load associated with ARC calculations. According to the approach illustrated in FIG. 3, if three harmonics are to be analyzed, the DFT procedures for the three harmonics can be respectively performed in different sector periods. For example, in the example illustrated in FIG. 3, during the first sector period 222a, the DFT for analyzing the root frequency 314, is performed, without performing DFT's for the second or third harmonics. In the next sector period 222b, the DFT for the second harmonic 316 is performed without performing a DFT for the root or the third harmonic. In the next sector period 222c, the DFT for the third harmonic 318 is performed, without performing DFT's for the root or second harmonic. Preferably, this pattern then repeats. Thus, the DFT for any one of the three harmonics to be analyzed is performed only once every three sector periods, rather than being performed each sector period. As a result, during each sector period 222a, 222b, 222c, the amount of time consumed by ARC procedures 324a, 324b, 324c, respectively, is reduced and the amount of time available for other procedures 326a, 326b, 326c, is increased (compared to the situation depicted in FIG. 2). Those with skill in the art, after understanding the present disclosure, will understand how to design and/or select circuitry and/or programming for adaptive runout correction of the type described above according to previous approaches.

Although this decrease in computational load is obtained at the "expense" of reducing the time-resolution or "granularity" for each frequency analysis, there are at least some disk drive configurations (e.g., balances between sector size, data density, rotation rate, and the like) in which such reduced time resolution still provides sufficient accuracy of ARC calculations that the ARC system operates with an acceptable level of accuracy, such as achieving relatively small track misregistration (TMR).

Figure 4:
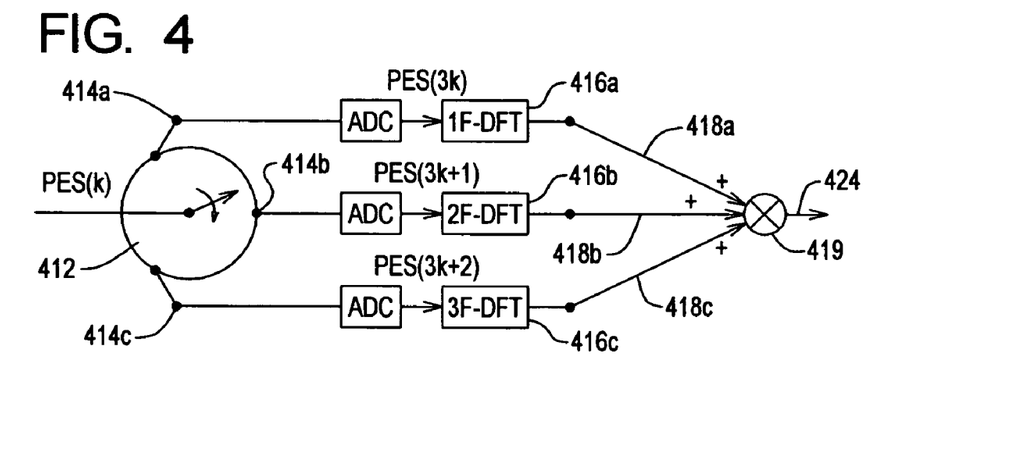
FIG. 4 is a block diagram showing logical organization of a procedure implementing the process of FIG. 3.

FIG. 4 provides a block diagram illustration of ARC calculations according to the timing of FIG. 3. FIG. 4 illustrates the logical organization of the procedure and it is anticipated that this logical organization would typically be implemented in a programmed microprocessor or similar device.

In the illustration of FIG. 4, during a given $k^{th}$ rotation through the N DFT calculations (where, in this illustration, N=3), PES (k) will be successively switched 412 to each of the N routines 414a, 414b, 414c, where the digitized PES signals are subjected to a root frequency (1F) DFT analysis 416a for PES(3k) to a second harmonic (2F) DFT analysis 416b for PES(3k+1) and a third harmonic (3F) DFT analysis 416c for PES(3k+2). The DFT outputs 418a, 418b, 418c are summed 419 and resultant value (with further processing as may be required) yields an ARCFF output 424. In one embodiment, the ARCFF is updated each servo period. In another embodiment, ARCFF is updated (based on the DFT outputs) only after a complete cycle of all harmonics' analyses has been completed (in the illustrated embodiment, this would be every third servo period.)

Although the procedure of FIGS. 3 and 4 show each of the three harmonics being analyzed at the same rate (in the illustrated embodiment, once every three servo periods), it is also possible to provide an overall reduction in computing load associated with ARC calculations using apparatus and procedures which provide different rates for at least some different harmonics or frequencies. This aspect of the invention is related to an appreciation that higher resolutions are needed, or useful, for relatively higher harmonics or frequencies.

As one example, Table I shows a manner in which various rates of analysis can be applied to different harmonics, from the root harmonic, 1F, through the fifth harmonic, 5F, over nine servo periods or servo "interrupt service requests" (ISR). In the illustration of Table I, the root frequency is subjected to a DFT analysis only once every four servo periods. The second harmonic is subjected to DFT analysis every other servo period. The third harmonic is subjected to DFT analysis every third servo period. The fourth harmonic, 4F, is subjected to DFT analysis every other servo period, and the fifth harmonic, 5F, is subjected to DFT analysis each servo period.

TABLE I

| Servo ISR | 1 | 2 | 3 | 4 | 5 | 6 | 7 | 8 | 9 |
|---|---|---|---|---|---|---|---|---|---|
| Harmonics | 1F | | | | 1F | | | | 1F |
| | | 2F | | 2F | | 2F | | 2F | |
| | | | 3F | | | 3F | | | 3F |
| | 4F | | 4F | | 4F | | 4F | | 4F |
| | 5F | 5F | 5F | 5F | 5F | 5F | 5F | 5F | 5F |

As illustrated in Table I, the distribution of frequencies of various servo periods, for analysis, is preferably done in such a fashion as to provide relatively small differences in the computing load from one servo period to the next period. For example, servo period one performs three DFT's (for the root, fourth and fifth harmonics). Servo period two performs two DFT's (for the second and fifth harmonics). Servo period nine performs four DFT's (for the root, third, fourth and fifth harmonics). Although embodiments can be provided in which the distribution of harmonics through successive servo periods is determined from a formula or calculation, preferably a distribution is stored in a table fashion (using table storage procedures well-known to those skilled in the art) e.g., using a table similar to that shown in Table I. Various methods can be used for providing an effective distribution table. The distribution table can be formed according to theoretical calculations and/or modeling of expected DFT computation times and tracking accuracies. It is possible to create a table heuristically based on modeling or sampling various table configurations. Tables can be configured and used on a drive model-specific basis, or can be determined and/or optimized for each unit with results being stored, e.g., during manufacturing, during a qualification procedure, during a boot-up operation, and the like. It is also possible to provide a distribution table that can be modified during use, e.g., to optimize results, such as in response to changes in type of usage (e.g., as degree of data localization), environmental changes (such as temperature, pressure, and the like), or other factors.

Figure 5:
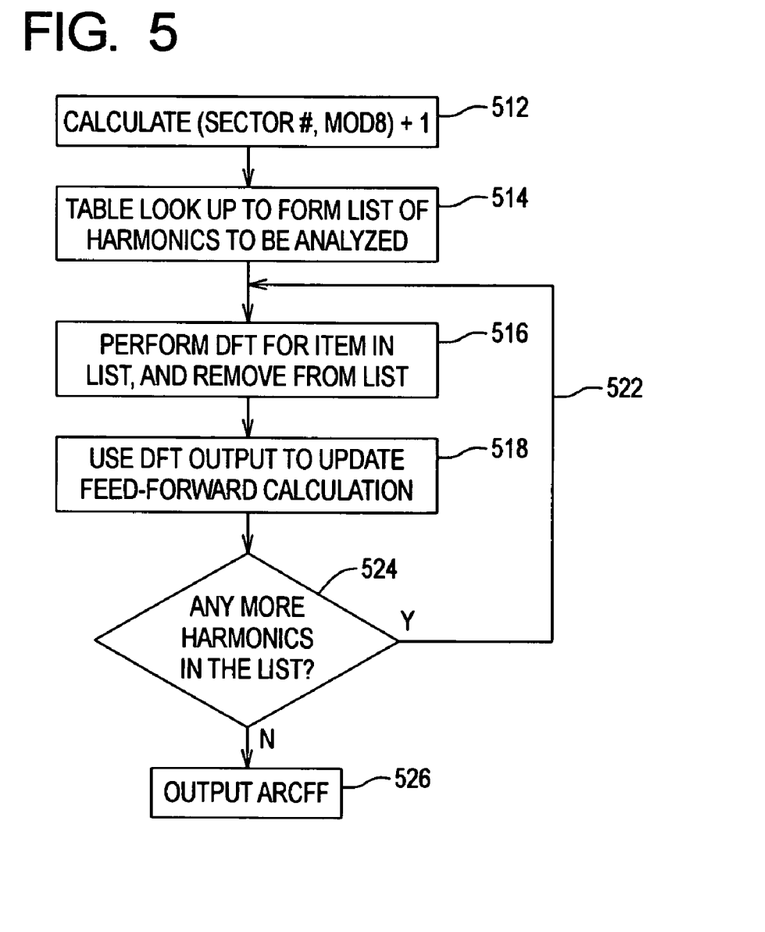
FIG. 5 is a flowchart for a simplified procedure according to an embodiment of the present invention.

FIG. 5 provides a flowchart for a simplified procedure which can be used to implement calculations according to the distribution of Table I. According to FIG. 5, (Sector#, Mod8)+1, is calculated 512, yielding a value between 1 and 9. Next, Table I is used to locate the column of Table I corresponding the number calculated in step 512 and the harmonics corresponding to that column are used to form a list of the harmonics to be analyzed during that particular sector period 514. A single DFT is performed for one of the items in the list and that harmonic is then removed from the list 516. The output from the DFT is then used to update the feed-forward calculation 518. The procedure loops 522 until there are no more harmonics left in the list 524 at which time the ARC feed-forward value is output 526. Although, according to the procedure of FIG. 5, both the harmonic power analysis 516 and the feed-forward calculation 518 are distributed according to Table I, it is possible to provide procedures in which only the DFT or other frequency distribution calculation 516 is distributed according to Table I or in which only the feed-forward calculation 518 is distributed according to Table I.

Figure 6:
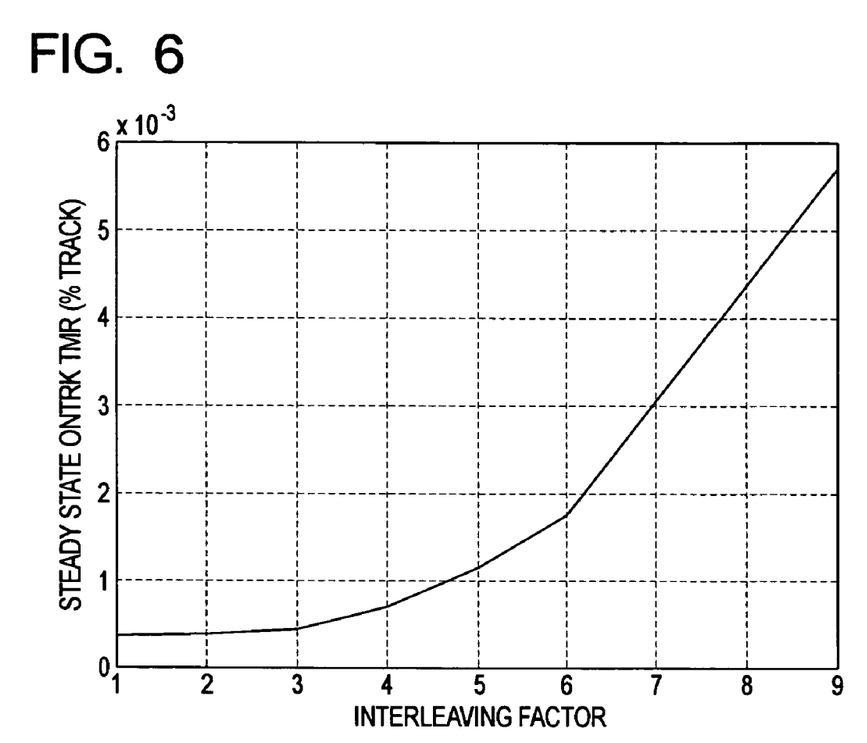
FIG. 6 is a graph showing modeled TMR changes for various interleaving factors.

As noted above, procedures according to the present invention which provide for at least some frequencies to be analyzed less frequently than every sector, provide a resolution which is lower than once per sector, or lower than one sample per sector. FIG. 6 provides a modeling result which illustrates expected effects of such reduction in resolution.

FIG. 6 shows how the track misregistration (TMR), in steady state conditions (expressed as a percentage of track width) changes for various interleaving factors (i.e., ranging from an analysis rate of 1 analysis per servo sector (for a given harmonic) to 1 analysis per nine servo sectors). Thus, FIG. 2 is an example with an interleaving factor of three.

As seen from FIG. 6, the impact of the on-track, steady state TMR attributable to the under sampling of the sample plus a longer Zero Order Hold (when adding back to the control output) is substantially negligible even with an interleaving factor equal to nine (being less than 6 percent off track).

Figure 7:
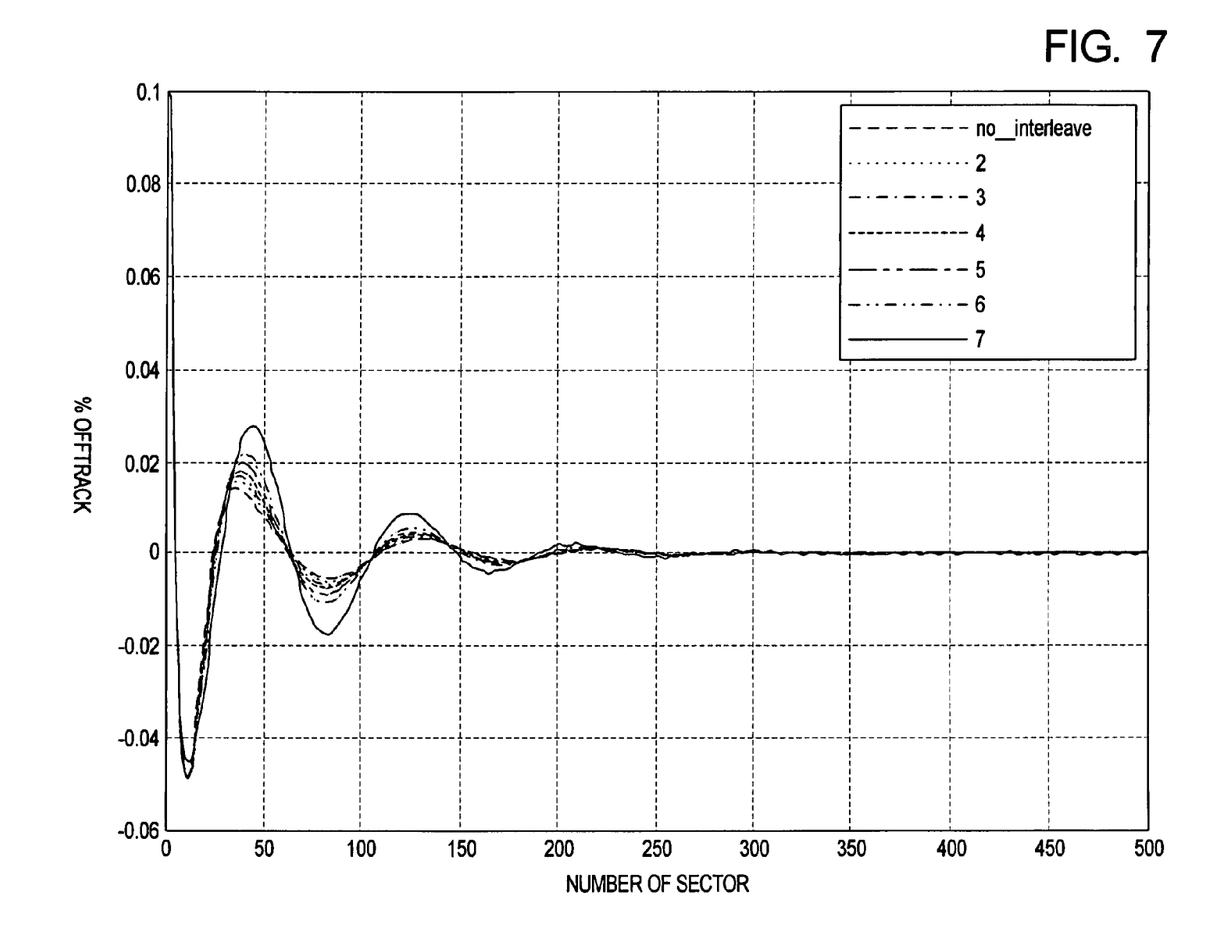
FIG. 7 is a graph showing modeled converge time for various interleaving factors.

Generally during seek and track-following operations, when a head arrives at a target track, it requires a certain amount of time for the head position to acceptably "settle" sufficiently near the center of the track. FIG. 7 shows a comparison of the converge time (expressed as the number of servo sectors needed to converge) for various interleave factors. As might be expected, there is a general trend that converge time becomes longer as the interleaving factor becomes bigger. However, at least when the interleaving factor is equal to or less than six, there is believed to be relatively little difference among the different factors.

In light of the above description, a number of advantages of the present invention can be seen. The present invention can reduce the computational load associated with adaptive runout calculations, preferably, without reducing accuracy below acceptable levels. The present invention can permit ARC calculations based on a larger number of (higher) harmonics without overwhelming available computing resources. The present invention can achieve the desired results, at least in some embodiments, using only changes in software or firmware, i.e., without requiring any changes in hardware. By, thus, maximizing the performance of existing processors or other hardware, hardware update cycles can be prolonged.

A number of variations and modifications of the invention can also be used. Although the present invention has been described substantially in terms of magnetic disk drives, at least some aspects of the invention can be usefully applied to other data storage devices such as compact disks, digital versatile disks, or other optical systems, and the like. Although certain procedures have been described by way of example, other procedures can be used including procedures having more or fewer steps and/or in which steps are performed in an order different from that described. The present invention can be used in connection with many ranges of harmonics or frequencies or selections of harmonics or frequencies. Although FIGS. 2 and 3 show substantially equal periods being required for performing calculations related to different harmonics, the present invention can also be used in connection with situations in which different harmonics require different periods of time for performing calculations. As noted above, ARC calculations can be considered as including both DFT calculations 118 and feed-forward calculations 122. Although in at least one embodiment, both types of these ARC calculations are performed in separate sector periods, for different harmonics or frequencies, it is also possible configure embodiments of the present invention in which only the power distribution calculations are performed in different sector periods for different harmonics or in which only the feed-forward calculations are performed for different harmonics in different sector periods.

The present invention, in various embodiments, includes components, methods, processes, systems and/or apparatuses substantially as depicted and described herein, including various embodiments, sub-combinations, and subsets thereof. Those with skill in the art will understand how to make and use the present invention after understanding the present disclosure. The present invention, and various embodiments, includes providing devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included a description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus usable in a data storage device having at least one rotatable disk having at least a first plurality of tracks defined thereon and at least one positionable head, each of said first plurality of tracks including indicators defining a plurality of sectors, the apparatus comprising:
    at least a first controllable actuator for positioning said head relative to a selected track;
    circuitry configured to:
        receive a first signal which is related to tracking of said head;
        determine at least a first value related to at least a first characteristic of at least first and second different frequency components of said first signal,
        wherein, during transit of at least one of first and second sectors, said first characteristic is determined for said first frequency component without determining said first characteristic for said second frequency component; and
        use said first value in controlling tracking to correct repeatable runout.

2. Apparatus as claimed in claim 1 wherein said data storage device is a magnetic disk drive.

3. Apparatus as claimed in claim 1 wherein said first signal comprises a position error signal.

4. Apparatus as claimed in claim 1 wherein said circuitry comprises a programmed microprocessor.

5. Apparatus as claimed in claim 1 wherein said first value comprises an adaptive runout correction feed-forward value.

6. Apparatus as claimed in claim 1 wherein said first characteristic comprises an indication of the magnitude of power of a frequency component of said first signal.

7. Apparatus as claimed in claim 1 wherein said first characteristic is determined using a discrete Fourier transform.

8. Apparatus as claimed in claim 1 wherein said first and second frequencies are integral multiples of said disk's frequency of rotation.

9. Apparatus as claimed in claim 1 wherein said circuitry is configured to repeat determination of said first characteristic of said first frequency component of said first signal, to define a first average rate, for determination for said first frequency component, and to repeat determination of said first characteristic of said second frequency component of said first signal, to define a second average rate, for determination for said second frequency component, and wherein said first rate is different from said second rate.

10. Apparatus as claimed in claim 1 wherein said first characteristic is determined at a plurality of different rates, for a plurality of different frequency components of said first signal.

11. Apparatus as claimed in claim 10 wherein said plurality of rates is defined in a table.

12. Apparatus as claimed in claim 10 wherein said plurality of rates are initially defined during manufacture of said data storage device and stored therein.

13. Apparatus as claimed in claim 10 wherein said circuitry is configured to update said plurality of rates periodically.

14. Apparatus as claimed in claim 10 wherein said circuitry is configured to update said plurality of rates in response to sensing of a change in at least one of environmental conditions, computational loads or error rates.

15. Apparatus as claimed in claim 10 wherein a rate for a given frequency component of said first signal is at least as large as a rate for a lower-frequency component of said first signal.

16. A method usable in a data storage device having at least one rotatable disk having at least a first plurality of tracks defined thereon and at least one positionable head, each of said first plurality of tracks including indicators defining a plurality of sectors, and at least a first controllable actuator for positioning said head relative to a selected track, the method comprising:
    receiving a first signal which is related to tracking of said head;
    determining at least a first value related to at least a first characteristic of at least first and second different frequency components of said first signal;
    wherein, during transit of at least one of first and second sectors, said first characteristic is determined for said first frequency component without determining said first characteristic for said second frequency component; and
    using said first value in controlling tracking to correct repeatable runout.

17. A method as claimed in claim 16 wherein said data storage device is a magnetic disk drive.

18. A method as claimed in claim 16 wherein said first signal comprises a position error signal.

19. A method as claimed in claim 16 wherein said step of determining and using are performed using a programmed microprocessor.

20. A method as claimed in claim 16 wherein said first value comprises an adaptive runout correction feed-forward value.

21. A method as claimed in claim 16 wherein said first characteristic comprises an indication of the magnitude of power of a frequency component of said first signal.

22. A method as claimed in claim 16 wherein said first characteristic is determined using a discrete Fourier transform.

23. A method as claimed in claim 16 wherein said first and second frequencies are integral multiples of said disk's frequency of rotation.

24. A method as claimed in claim 16 further comprising:
repeating determination of said first characteristic of said first frequency component of said first signal, to define a first average rate, for determination for said first frequency component;
repeating determination of said first characteristic of said second frequency component of said first signal, to define a second average rate, for determination for said second frequency component;
wherein said first rate is different from said second rate.

25. A method as claimed in claim 16 wherein said first characteristic is determined at a plurality of different rates, for a plurality of different frequency components of said first signal.

26. A method as claimed in claim 25 wherein said plurality of rates is defined in a table.

27. A method as claimed in claim 25 wherein said plurality of rates are initially defined during manufacture of said data storage device and stored therein.

28. A method as claimed in claim 25 further comprising updating said plurality of rates periodically.

29. A method as claimed in claim 25 further comprising updating said plurality of rates in response to sensing of a change in at least one of environmental conditions, computational loads or error rates.

30. A method as claimed in claim 25 wherein the rate for a given frequency component of said first signal is at least as large as the rate for a lower-frequency component of said first signal.

31. Apparatus usable in a data storage device having at least one rotatable disk having at least a first plurality of tracks defined thereon and at least one positionable head, each of said first plurality of tracks including indicators defining a plurality of sectors, and at least a first controllable actuator for positioning said head relative to a selected track, the method comprising:
means for receiving a first signal which is related to tracking of said head;
means for determining at least a first value related to at least a first characteristic of at least first and second different frequency components of said first signal wherein, during transit of at least one of first and second sectors, said first characteristic is determined for said first frequency component without determining said first characteristic for said second frequency component; and
means for using said first value in controlling tracking to correct repeatable runout.

32. Apparatus as claimed in claim 31 wherein said data storage device is a magnetic disk drive.

33. Apparatus as claimed in claim 31 wherein said first signal comprises a position error signal.

34. Apparatus as claimed in claim 31 wherein said means for determining and said means for using comprise a programmed microprocessor.

35. Apparatus as claimed in claim 31 wherein said first value comprises an adaptive runout correction feed-forward value.

36. Apparatus as claimed in claim 31 wherein said first characteristic comprises an indication of the magnitude of power of a frequency component of said first signal.

37. Apparatus as claimed in claim 31 wherein said first characteristic is determined using a discrete Fourier transform.

38. Apparatus as claimed in claim 31 wherein said first and second frequencies are integral multiples of said disk's frequency of rotation.

39. Apparatus as claimed in claim 31 further comprising:
first means for repeating determination of said first characteristic of said first frequency component of said first signal, to define a first average rate, for determination for said first frequency component; and
second means for repeating determination of said first characteristic of said second frequency component of said first signal, to define a second average rate, for determination for said second frequency component;
wherein said first rate is different from said second rate.

40. Apparatus as claimed in claim 39 wherein said first and second means comprise a programmed microprocessor.

41. Apparatus as claimed in claim 31 wherein said first characteristic is determined at a plurality of different rates, for a plurality of different frequency components of said first signal.

42. Apparatus as claimed in claim 41 wherein said plurality of rates is defined in a table.

43. Apparatus as claimed in claim 41 wherein said plurality of rates are initially defined during manufacture of said data storage device and stored therein.

44. Apparatus as claimed in claim 41 further comprising means for updating said plurality of rates periodically.

45. Apparatus as claimed in claim 44 wherein said means for updating comprises a programmed microprocessor.

46. Apparatus as claimed in claim 41 further comprising means for updating said plurality of rates in response to sensing of a change in at least one of environmental conditions, computational loads or error rates.

47. Apparatus as claimed in claim 41 wherein the rate for a given frequency component of said first signal is at least as large as the rate for a lower-frequency component of said first signal.

* * * * *